Figure 1:
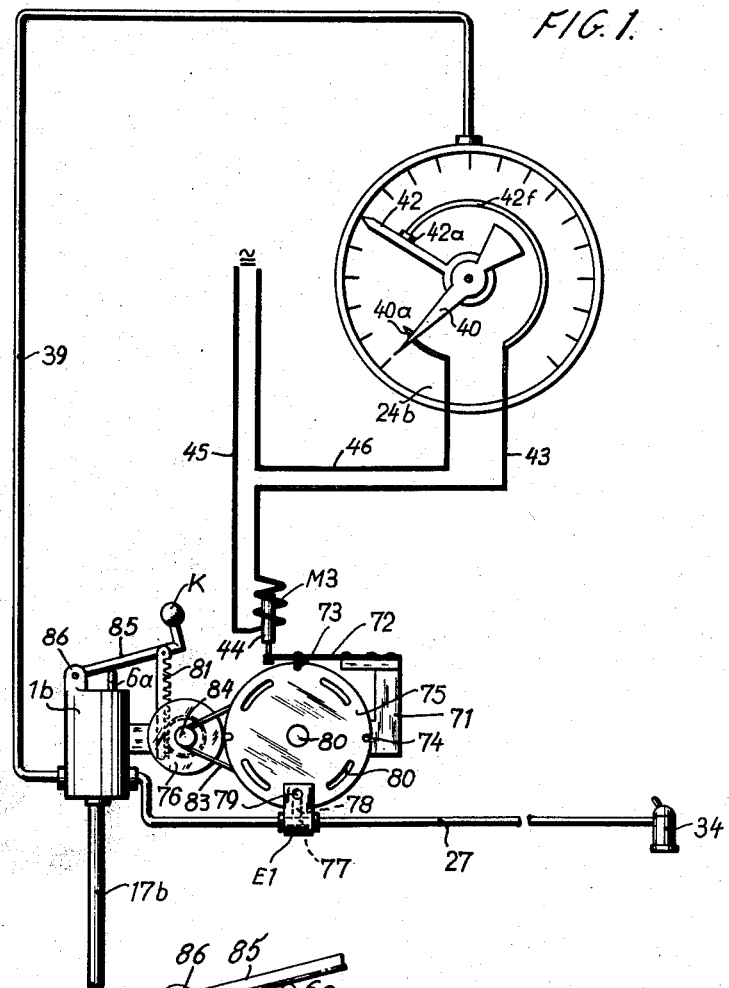

July 5, 1960  R. EICHENAUER  2,943,637
TIRE INFLATING AND TESTING DEVICE
Filed Oct. 1, 1956

INVENTOR
Rudolf Eichenauer
By B. Eshlinger
Attorney

United States Patent Office 2,943,637
Patented July 5, 1960

2,943,637

TIRE INFLATING AND TESTING DEVICE

Rudolf Eichenauer, Allerheiligenstrasse 77,
Frankfurt am Main, Germany

Filed Oct. 1, 1956, Ser. No. 613,041

Claims priority, application Germany Oct. 4, 1955

7 Claims. (Cl. 137—224)

The present invention relates to apparatus for automatically inflating tires of automotive vehicles. In a still more specific aspect, the invention relates to mechanism, which forms part of an automatic tire-inflating apparatus, and which is specifically designed to automatically vent a tire under control of a manometer to insure that the pressure of air in the tire does not exceed a desired pressure. More specifically, this invention is an improvement over the venting apparatus disclosed in my pending application Serial No. 493,696, filed March 11, 1955, which issued as Patent No. 2,818,080 on December 31, 1957.

In the tire-inflating apparatus of my prior application mentioned, there is, of course, an air hose for supplying and evacuating compressed air from the tire which is to be inflated. A conventional nipple on one end of this hose is adapted to connect the hose with the tire. In one embodiment of this apparatus, there is a timer which controls an electromagnet (solenoid) that in turn operates a reciprocable valve that in one position connects the air hose with a source of compressed air supply and that in another position connects the air hose with a manometer. This timer operates in such way that relatively long periods of connection of the tire with the source of compressed air supply, for inflation of the tire, alternate with relatively short periods of connection of the tire with the manometer, for measurement of the pressure in the tire. As the pressure in the tire increases, the indicating pointer of the manometer is advanced. It continues to advance until the pressure in the tire exceeds the desired pressure. At this point, an electrical contact, which is carried by this pointer, closes an electric circuit that automatically cuts out the timer and automatically cuts-in a relay. This relay controls a second solenoid-operated reciprocable valve that in operation alternately connects the tire with atmosphere, to vent excess pressure from the tire, and with the manometer, to measure the pressure in the tire. The excess pressure in the tire will then be alternately vented and measured until the pressure in the tire has dropped to the desired pressure. Then the apparatus will cease operation; the tire-inflating process will be completed.

The venting mechanism of my above mentioned application has the disadvantage that because of the impact of the armature of the electromagnet when drawn down, a vibration is created which must be deadened by a rubber suspension. A further disadvantage with this apparatus is that for actuation of the electromagnet a proportionately higher current is required which cannot be secured without special cable leads.

The primary object of the present invention is to provide an inflating apparatus which will avoid the disadvantages of the apparatus of my prior application mentioned.

The disadvantages of my previous apparatus are overcome in the present invention by venting the tire by a pressure relief valve, a part of which is built in or on the hose or duct through which the tire is inflated and vented, and a part of which consists of a member which slides relative to the part that is built into the duct and which has spaced openings to atmosphere that register with the first-named part as the second-named part slides past the first-named part. Through this arrangement the pounding action of the magnet armature is eliminated. Moreover, for the stopping and starting of the sliding part a weak elecrical force is sufficient, a force such as, for instance, can be generated by a built-in flashlight battery. Preferably the sliding member is a rotary disc, which has a plurality of openings, that vent to atmosphere, spaced from one another around its periphery. The disc is adapted to be rotated under control of the manometer. When the pressure registered by the manometer exceeds the desired pressure for the tire, a solenoid is actuated to disengage a pawl, that normally holds the disc against rotation. The disc may then be rotated to bring the next opening in it into registry with the valve part, that is attached to the hose, to permit the tire to be vented. Rotation of the disc may be effected manually or by motor power. When the pressure in the tire drops to the desired pressure, the solenoid is deenergized, and the pawl returns under spring pressure into engagement with the disc to stop rotation of the disc. The notches in the periphery of the disc, which are adapted to be engaged by the pawl, are so located that when the pawl is in engaged position a solid part of the disc will be in registry with the part of the vent valve that is on the air hose, thus stopping the venting operation.

Figure 2:
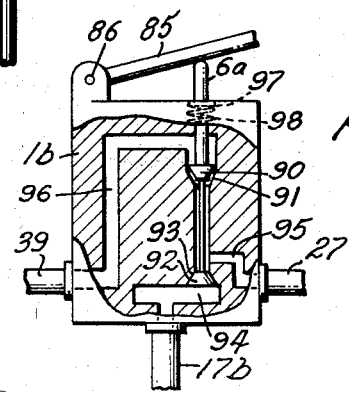

In the drawing:

Fig. 1 is a view illustrating diagrammatically tire inflating and testing apparatus constructed according to one embodiment of this invention; and Fig. 2 is a side elevation, with parts broken away and shown in section, of a three-way valve such as may be used in this embodiment of the invention.

Referring now to the drawing by numerals of reference, 1b denotes a three-way valve that controls supply of compressed air to the tire, that is being inflated, and testing of the pressure in the tire. This valve may be of conventional construction. 6a denotes the valve rod which projects out of the valve casing and which is used in depressing the valve against a spring 98 (Fig. 2) that is housed in the valve casing and that abuts against a washer or shoulder 97 that is fixed to rod 6a. The valve may be operated under control of timers, as described in my application above mentioned, for inflating the tire. The valve is connected by duct 17b with an air compressor or other source of compressed air. It is connected by hose or tubing 27 and nipple 34 with the tire. It is connected by tubing 39 with the manometer 24b. The valve rod 6a has two conical valve portions 90 and 92 thereon which are spaced axially and opposed to one another. Valve portion 90 is adapted to seat on a conical valve seat 91 in the valve casing when the valve rod is depressed. Valve portion 92 seats on a conical valve seat 93 in the valve casing when the valve rod 6a is raised to the position shown in Fig. 2 by spring 98.

When the valve rod is in its upper position, to which it is constantly urged by the spring 98, the hose or tubing 27 is connected through ducts 95, 96 in the valve casing to the conduit 39 so that the pressure of air in the tire can be measured by the manometer 24b. When the valve rod is in its lower position, the hose or tubing 27 is connected through ducts 95 and 94 in the valve casing to the conduit 17b.

The manometer has an adjustable pointer 42 which is preset to the pressure desired in the tire. It has an indicating pointer 40 which is actuated by the compressed air flowing to the manometer from the tube 39 and hose 27. 42a denotes an electrical contact which slides on an arcuate rail 42f. This rail is connected by lead 43 with the coil M3 of a solenoid whose armature is denoted at 44. The coil M3 is connected, in turn, by a lead 45 with one side of an electric power supply such as a battery. The other side of this source of electric power supply is connected to the indicating pointer or needle 40 by a lead 46. Pointer 40 carries an electric contact 40a which is adapted to engage contact 42a and complete a circuit to the solenoid coil M3, when the pressure in the tire exceeds the pressure to which pointer 42 has been set and when as a result pointer 40 is moved beyond the position of pointer 42.

Solenoid armature 44 is connected to a flexible lever 72 that is mounted on the block 71. This lever carries a pin 73 that is adapted to be engaged in one or other of the several recesses 74 of a rotary disc 75. Disc 75 rotates on a shaft 82.

The hose or tubing 27 is made in two sections connected by a venting valve $E_1$ which is so interposed between the two sections that the bore 77 of the valve registers with and connects the bores of the two sections of the hose or tubing. The valve has a duct 78 communicating with its bore 77 and extending radially of bore 77. The valve also has a transverse duct 79 adapted to communicate with duct 78. The valve is forked above tubing 27 to straddle and closely fit the disc 75 adjacent the periphery of the disc. The disc is provided with a plurality of angularly-spaced elongate arcuate slots 80. When one of these slots registers with duct 79 air can flow from tube 27 through ducts 77, 78 and 79 of the valve $E_1$, and thus the tire can be vented. When a solid portion of the disc 75 is in the forked part of valve $E_1$, that is, is in registry with duct 79, the duct 79 is sealed and no air can escape from hose 27.

The recesses 74 in the periphery of disc 75 are so located that when the disc is locked against rotation by engagement of pin or pawl 73 in one of the recesses 74, a solid portion of disc 75 will be in registry with duct 79, and no air can escape from the hose 27. When the pawl 73 is disengaged from the disc, however, the disc can be rotated to bring a slot 80 into registry with duct 79, or to bring successive slots 80 in succession into registry with duct 79. When a slot 80 is in registry with duct 79, as previously stated air can escape from hose 27 to atmosphere. If the disc 75 is rotated rapidly, the slots 80 will be brought in rapid succession into registry with the duct 79 and the air will escape in rapid puffs, the escape duct 79 being alternately shut-off and opened to atmosphere as the disc rotates.

The disc may be driven by power from an electric motor through belt 83 and pulleys on the armature shaft 84 of the motor and on shaft 82, respectively.

In place of an electric motor, there can be substituted a motor 76 driven by spring power. For the purpose of winding up this spring motor a lever 85 is provided. This lever is pivoted at one end by means of a pin 86 on the valve casing 1b. It is adapted to be manipulated by a knob K that is secured to its free end. It is pivotally connected to a rack 81 which upon downward movement of the knob K actuates in known manner a spring winding apparatus for the spring motor 76. The lever engages rod 6a of valve 1b so that this valve is opened against resistance of its spring 98, also, upon downward movement of knob K.

The operation of the mechanism will be understood from the preceding description. When the valve rod 6a is depressed either by operation of lever 85, or by timer controlled solenoids as described in my application above mentioned, the compressed air supply duct 17b will be connected to hose 27 through ducts 94 and 95 so that compressed air will flow from the supply source through hose 27 and tire filling nipple 34. When the valve rod 6a is released, it will return to its upper position shown in Fig. 2 and the tire will be connected by hose 27, ducts 95 and 96 in valve casing 1b, and duct 39 with the manometer 24b. This will actuate the pointer 40 to indicate the pressure in the tire. If the pressure desired in the tire is exceeded, then the pointer 40 of the manometer 24b will rise beyond the fixed pointer 42, which has previously been adjusted to the pressure desired. The contact finger 40a will then engage the contact plate 42a; and the coil M3 will then be energized to draw the pin 73 out of the recess 74 in the disc with which it has been engaged. The disc 75 will thereupon be rotated by the electric motor or by the spring motor 76 through the belt 83 and the pulleys, with which the belt engages. In its rotation the disc will slide through the forked section of the valve body $E_1$. The slots 80 will thereupon be brought successively into registry with the valve duct 79, and the air will be able to escape from hose 27 and the tire. The time of the momentary venting periods is determined by the speed of rotation of the disc 75.

As the pressure in the tire falls, the needle or pointer 40 will fall. If with reversal of the manometer pointer 40 the contacts 40a and 42a are broken, then the spring-actuated lever 72 will cause the pin 73 to drop onto the periphery of the rotating disc 75; and the pin will snap into one of the recesses 74 when this recess registers with the pin. This will stop rotation of the disc.

Since the recesses 74 are so arranged that the unbroken, or solid, part of the disc 75 comes into registry with duct 79, when the pin is in engagement with a recess 74, then at this moment the valve $E_1$ will be closed and thereby the venting process will be ended. The desired pressure adjusted by the manometer indicator 42 is now in the tire since exactly at this point the contact 40a of the pointer 40 is released from the manometer contact 42a.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Venting apparatus for compressed air, especially for motor vehicle tires, comprising a conduit for conducting compressed air to and from a tire, a manometer connected to said conduit to measure the pressure of air in said conduit, a duct also connected to said conduit, a rotary member for closing said duct to prevent escape of air from said conduit through said duct, said member having a plurailty of ports communicating with atmosphere and spaced equi-angularly about its axis of rotation, said member also having a plurality of recesses spaced equi-angularly about its axis, said recesses alternating with said ports, means for rotating said member to bring a port into registry with said duct to permit venting of air from said conduit, a locking member adapted to engage in said recesses to lock said rotary member against rotation with said rotary member closing said duct, and means operated by said manometer, when a pressure in excess of a predetermined pressure is recorded in said conduit, for moving said locking member to released position.

2. Venting apparatus for compressed air, especially for motor vehicle tires, comprising a conduit for conducting compressed air to and from a tire, a manometer connected to said conduit to measure the pressure of air in said conduit, a duct also connected to said conduit, a rotary member for closing said duct to prevent escape of air from said conduit through said duct, said member having a plurality of ports communicating with atmosphere and spaced equi-angularly about its axis of rotation, said member also having a plurality of recesses spaced equi-angularly about its axis, said recesses alternating with said ports, means for rotating said member to bring a port into registry with said duct to permit venting of air from said conduit, a locking member adapted to engage in said recesses to lock said rotary member against rotation with said rotary member closing said duct, a solenoid for moving said locking member to inoperative position, and means carried by said manometer operative, when a pressure in excess of a predetermined pressure is recorded in said conduit, for closing an electric circuit to said solenoid.

3. Tire inflating and deflating apparatus comprising a valve, means connecting said valve to a source of compressed air supply, a manometer, means connecting said valve to said manometer, a conduit for conducting compressed air to and from a tire, said valve being movable from a first position, in which it connects said source of compressed air supply to said conduit, to a second position in which it connects said conduit to said manometer to measure the air pressure in said conduit, a duct connected to said conduit, a member for closing said duct to prevent escape of air from said conduit through said duct, said member having a port therein communicating with atmosphere and being movable to bring said port into registry with said duct, a spring motor for driving said member, means for holding said member against movement, means actuated by said manometer, when a pressure in excess of a predetermined pressure is recorded, for moving said holding means to inoperative position, manually movable means for moving said valve to said first position, and means connected to said manually-movable means for winding said spring motor during movement of said valve to said first positoin.

4. Tire inflating and deflating apparatus comprising a valve, means connecting said valve to a source of compressed air supply, a manometer, means connecting said valve to said manometer, a conduit for conducting compressed air to and from a tire, said valve being movable from a first position, in which it connects said source of compressed air supply to said conduit, to a second position in which it connects said conduit to said manometer to measure the air pressure in said conduit, a duct connected to said conduit, a rotary member for closing said duct to prevent escape of air from said conduit through said duct, said rotary member having a plurality of ports communicating with atmosphere and spaced equiangularly about its axis of rotation, said rotary member also having a plurality of recesses spaced equi-angularly about its axis, said recesses alternating with said ports, means tending to continuously drive said rotary member, means for holding said rotary member against rotation comprising a pawl engageable in said recesses, a solenoid for moving said pawl to disengaged position, and means connecting said solenoid to said manometer to close an electric circuit to said solenoid to energize said solenoid when the pressure in said conduit as recorded by said manometer exceeds a predetermined pressure.

5. Tire inflating and deflating apparatus comprising a first valve, first means connecting said first valve to a source of compressed air supply, an air-pressure operated device, means connecting said first valve to said air-pressure operated device, a conduit connected with said first valve for conducting compressed air to and from a tire, said first valve being movable from a first position, in which it connects said first means to said conduit, to a second position in which it connects said conduit to said air-pressure-operated device, a second valve, said second valve being mounted on said conduit to connect said conduit to atmosphere when open, actuating means for imparting movement to said second valve to alternately open and close the same, means for holding said second valve closed and against movement by said actuating means, and means connecting said air-pressure operated device to said holding means to retract said holding means from operative position when said first valve is in its second position and the pressure in said conduit exceeds a predetermined amount.

6. Tire inflating and deflating apparatus comprising a first valve, first means connecting said first valve to a source of compressed air supply, a pressure gauge, means connecting said first valve to said pressure gauge, a conduit connected with said first valve for conducting compressed air to and from a tire, said first valve being movable from a first position, in which it connects said first means to said conduit to a second position in which it connects sad conduit to said pressure gauge, a second valve, said second valve being mounted to connect said conduit to atmosphere when open, means for holding said second valve closed, means connected to said gauge to retract said holding means when said first valve is in its second position and the pressure in said conduit exceeds a predetermined amount, actuating means for imparting rapid movement to said second valve, to alternately open and close the same rapidly when said holding means is retracted, said holding means having means to return said holding means to holding position as soon as the pressure in said conduit drops below said predetermined amount, and means for manually presetting the predetermined pressure at which said retracting means operates.

7. Tire inflating and deflating apparatus comprising a first valve, first means connecting said first valve to a source of compressed air supply, a pressure gauge, means connecting said first valve to said pressure gauge, a conduit connected with said first valve for conducting compressed air to and from a tire, said first valve being movable from a first position, in which it connects said first means to said conduit to a second position in which it connects said conduit to said pressure gauge, a rotary second valve, said second valve being mounted to connect said conduit to atmosphere when open, means for holding said second valve in closed position, means connected to said gauge to retract said holding means when said first valve is in its second position and the pressure in said conduit exceeds a predetermined amount, actuating means for imparting rapid rotation to said second valve to alternately open and close the same, when said holding means is retracted, said holding means having means to return said holding means to holding position as soon as the pressure in said conduit drops below said predetermined amount, and means for manually presetting the predetermined pressure at which said retracting means operates.

References Cited in the file of this patent

UNITED STATES PATENTS

| | | |
|---|---|---|
| 1,813,100 | Swindle | July 7, 1931 |
| 2,029,085 | Sussin | Jan. 28, 1936 |
| 2,059,045 | Seymour | Oct. 27, 1936 |
| 2,281,605 | Smith | May 5, 1942 |
| 2,780,242 | Dyson | Feb. 5, 1957 |